(12) United States Patent
Schreck et al.

(10) Patent No.: US 11,934,687 B2
(45) Date of Patent: Mar. 19, 2024

(54) FULL DISK SERPENTINE WRITE PATH FOR TAMPER-PROOF DISK DRIVE

(71) Applicant: Western Digital Technologies, Inc., San Jose, CA (US)

(72) Inventors: Erhard Schreck, San Jose, CA (US); Sukumar Rajauria, San Jose, CA (US); Robert Smith, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 40 days.

(21) Appl. No.: 17/743,386

(22) Filed: May 12, 2022

(65) Prior Publication Data
US 2023/0367506 A1    Nov. 16, 2023

(51) Int. Cl.
*G06F 3/06* (2006.01)
(52) U.S. Cl.
CPC .......... *G06F 3/0655* (2013.01); *G06F 3/0604* (2013.01); *G06F 3/0676* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2003/0697; G06F 2009/45562–45595; G06F 2015/761–768; G06F 2201/00–885; G06F 2206/00–20; G06F 2209/00–549;
(Continued)

(56) References Cited

U.S. PATENT DOCUMENTS 5,650,886 A * 7/1997 Codilian ................ G11B 19/00
6,980,386 B2 * 12/2005 Wach .................... G11B 5/5526
(Continued)

OTHER PUBLICATIONS

J. Gim, Y. Won, J. Chang, J. Shim and Y. Park, "DIG: Rapid Characterization of Modern Hard Disk Drive and Its Performance Implication," 2008 Fifth IEEE International Workshop on Storage Network Architecture and Parallel I/Os, Baltimore, MD, USA, 2008, pp. 74-83, doi: 10.1109/SNAPI.2008.13. (Year: 2008).*

*Primary Examiner* — Daniel C. Chappell
(74) *Attorney, Agent, or Firm* — PATTERSON + SHERIDAN, LLP; Steven H. VerSteeg (57) ABSTRACT

The present disclosure generally relates to a multi-disk drive comprising a plurality of media surfaces and a plurality of heads, wherein a head of the plurality of heads is configured to be actuated over each surface of the plurality of media surfaces. The multi-disk drive further comprises control circuitry configured to write data to a first media surface of the plurality of media surfaces using a first head of the plurality of heads, and after all of an available memory of the first media surface has been filled, write data to a second media surface of the plurality of media surfaces using a second head of the plurality of heads. The control circuitry is further configured to permanently disable write access to one or more media surfaces of the plurality of media surfaces, while continuing to permit read access to the plurality of media surfaces.

21 Claims, 8 Drawing Sheets

(58) Field of Classification Search
CPC ...... G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | |
|---|---|---|---|
| 7,872,822 B1 | 1/2011 | Rothberg | |
| 8,134,798 B1* | 3/2012 | Thelin | G11B 20/1258 360/39 |
| 8,687,306 B1* | 4/2014 | Coker | G11B 5/5521 360/55 |
| 8,693,133 B1* | 4/2014 | Lee | G11B 5/59633 360/75 |
| 8,817,413 B1* | 8/2014 | Knigge | G11B 5/6005 360/75 |
| 8,964,320 B1* | 2/2015 | Hu | G11B 19/048 360/25 |
| 10,665,263 B1 | 5/2020 | Xiong et al. | |
| 11,532,330 B1* | 12/2022 | Biskeborn | G11B 20/22 |
| 11,681,437 B2* | 6/2023 | Abe | G06F 3/061 711/111 |
| 2005/0231846 A1 | 10/2005 | Winarski et al. | |
| 2005/0235095 A1 | 10/2005 | Winarski et al. | |
| 2019/0347020 A1 | 11/2019 | Allo | |
| 2022/0269408 A1* | 8/2022 | Abe | G06F 3/0656 |
| 2023/0154492 A1* | 5/2023 | Watson | G11B 5/00817 360/77.12 |
| 2023/0267964 A1* | 8/2023 | Biskeborn | G11B 21/103 360/77.13 |

\* cited by examiner

FULL DISK SERPENTINE WRITE PATH FOR TAMPER-PROOF DISK DRIVE

BACKGROUND OF THE DISCLOSURE

Field of the Disclosure

Embodiments of the present disclosure generally relate to a disk drive configured to write data in a serpentine write path.

Description of the Related Art

Multi-head disk drives comprise a plurality of heads configured to read and write data to a plurality of media surfaces. At least one head of the plurality of heads is actuated over each media surface of the plurality of disks (i.e. a head is actuated over each of a top and a bottom surface of each disk of the plurality of disks). Each head has a write element configured to write data to a media surface and a read element configured to read data from the media surface. Each media surface comprises a plurality of radially spaced concentric data tracks. In prior art multi-head disk drives, the disk drive is configured to first write data to an outer data track of the concentric data tracks of each media surface. Once all of the outer data tracks of the plurality of media surfaces have been filled, the inner data tracks may be written to.

After data is written, to prevent unauthorized write access to the media surface, write access to the disk may be disabled while still permitting read access to the disk (i.e., the write transducer is disabled, but the read transducer remains functional). However, write access is typically maintained until all available memory of a media surface has been filled so that the overall available memory of the disk drive is not decreased. Thus, by first writing to the outer data track of each disk of the plurality of disks, a security concern is created because write access to each media surface is maintained over a long period of time since the available memory of each media surface is filled at approximately the same rate.

Therefore, there is a need in the art for a disk drive configured to write data to a plurality of media surfaces in a manner that increases security without reducing available memory.

SUMMARY OF THE DISCLOSURE

The present disclosure generally relates to a multi-disk drive comprising a plurality of media surfaces and a plurality of heads, wherein a head of the plurality of heads is configured to be actuated over each surface of the plurality of media surfaces. The multi-disk drive further comprises control circuitry configured to write data to a first media surface of the plurality of media surfaces using a first head of the plurality of heads, and after all of an available memory of the first media surface has been filled, write data to a second media surface of the plurality of media surfaces using a second head of the plurality of heads. The control circuitry is further configured to permanently disable write access to one or more media surfaces of the plurality of media surfaces, while continuing to permit read access to the plurality of media surfaces.

In one embodiment, a data storage device comprises: a first media surface; a first head configured to be actuated over the first media surface, wherein the first head comprises a first write transducer and a first read transducer; a second media surface; a second head configured to be actuated over the second media surface, wherein the second head comprises a second write transducer and a second read transducer; and control circuitry configured to: first write data to the first media surface using the first write transducer of the first head; optionally receive an indication that an available memory of the first media surface has been filled; and then upon filling the first media surface begin to write data to the second media surface using the second write transducer.

In another embodiment, a data storage device comprises: a first media surface; a first head configured to be actuated over the first media surface wherein the first head comprises a first write transducer and a first read transducer; a second media surface; a second head configured to be actuated over the second media surface wherein the second head comprises a second write transducer and a second read transducer; a third media surface; a third head configured to be actuated over the third media surface wherein the third head comprises a third write transducer and a third read transducer; and control circuitry configured to: first write data to the first media surface using the first write transducer; then upon filling the first media surface write data to the second media surface using the second write transducer; and reserve a portion of an available memory of the third media surface.

In yet another embodiment, a data storage device comprises: a plurality of media surfaces; a plurality of heads disposed over the plurality of media surfaces, wherein each head of the plurality of heads is capable of being actuated over a different media surface of the plurality of media surfaces, and wherein each head of the plurality of heads comprises a write transducer and a read transducer; and control circuitry configured to: first write data to a first media surface of the plurality of media surfaces using a first write transducer of a first head of the plurality of heads; and then upon filling the first media surface write data to a second media surface of the plurality of media surfaces using a second write transducer of a second head of the plurality of heads; means to disable at least one write transducer of the plurality of heads.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a multi-disk drive comprising a plurality of media surfaces and a plurality of heads, wherein a head of the plurality of heads is configured to be actuated over each surface of the plurality of media surfaces. The multi-disk drive further comprises control circuitry configured to write data to a first media surface of the plurality of media surfaces using a first head of the plurality of heads, and after all of an available memory of the first media surface has been filled, write data to a second media surface of the plurality of media surfaces using a second head of the plurality of heads. The control circuitry is further configured to permanently disable write access to one or more media surfaces of the plurality of media surfaces, while continuing to permit read access to the plurality of media surfaces.

Figure 1A:
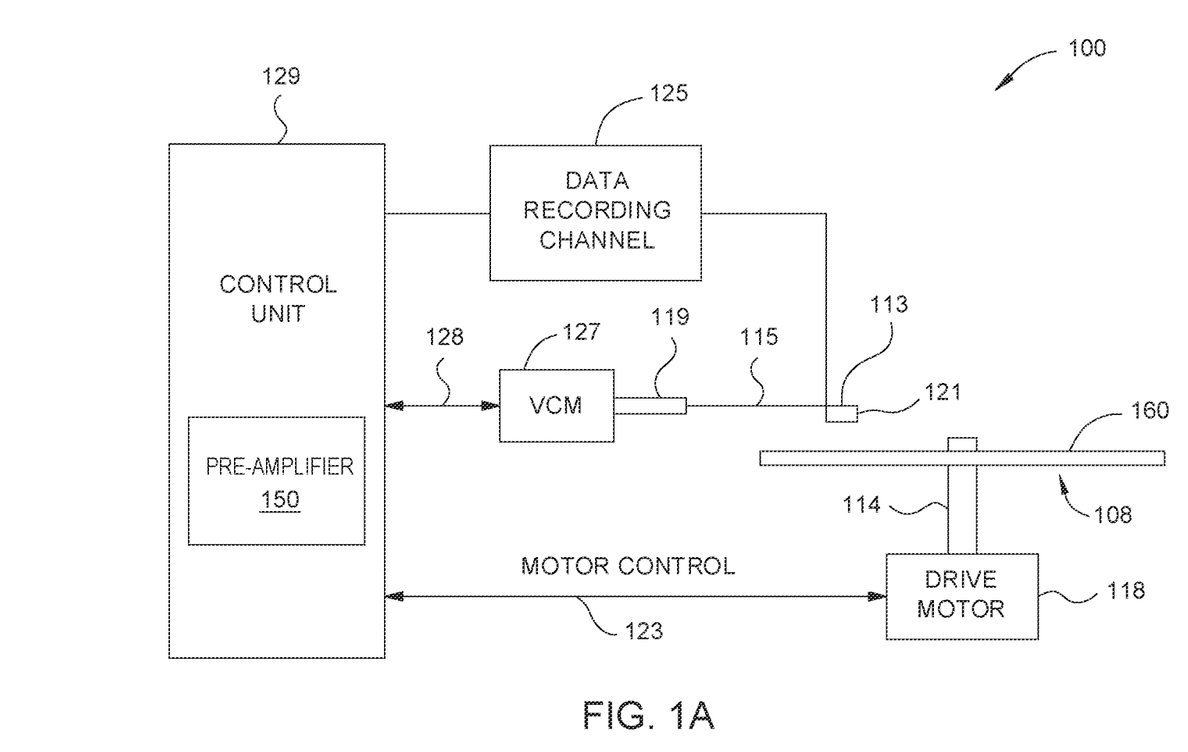
FIG. 1A illustrates a schematic view of a disk drive according to one embodiment.
Figure 1B:
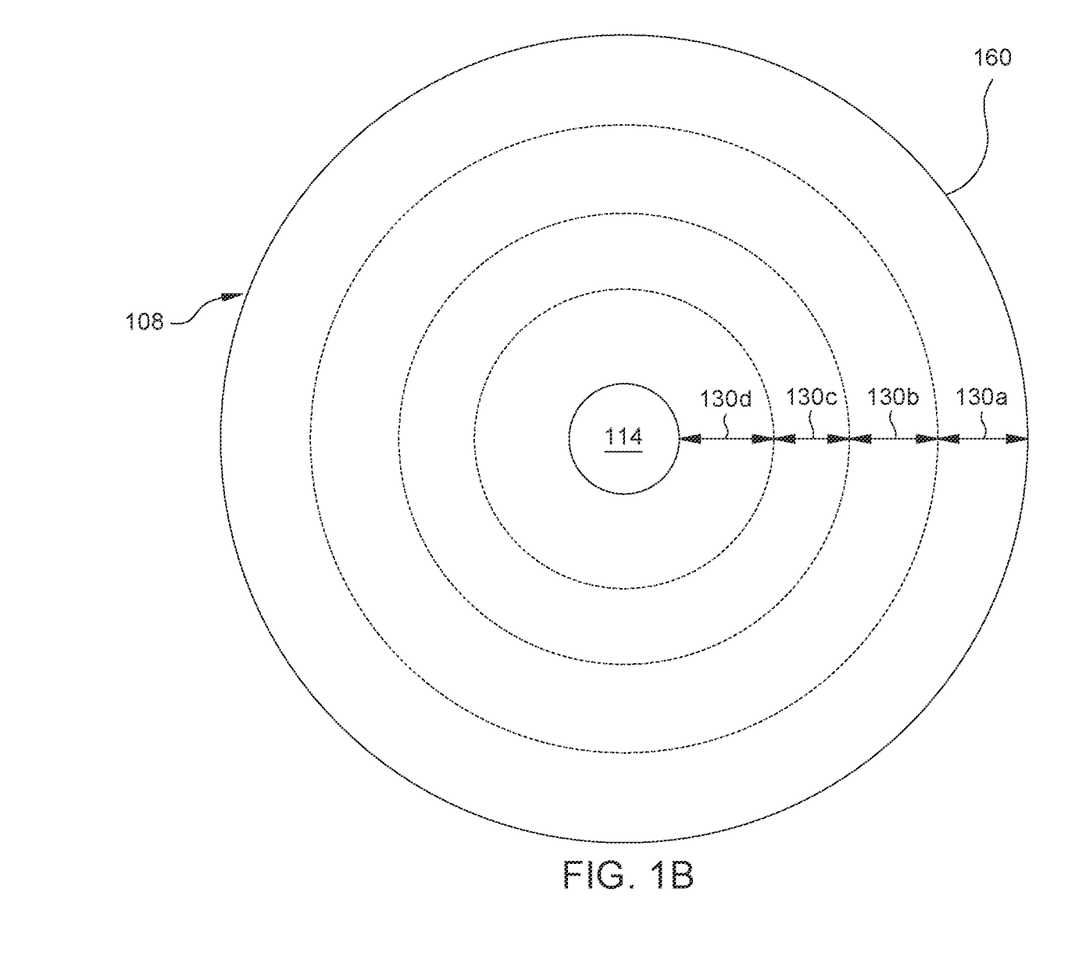
FIG. 1B illustrates a schematic view of a media surface of the disk drive of FIG. 1A.

FIG. 1A illustrates a schematic view of a disk drive (e.g., magnetic recording device) 100, according to one implementation. Disk drive 100 comprises at least one rotatable magnetic media 108 supported on a spindle 114 and rotated by a disk drive motor 118. The magnetic recording on each disk is in the form of any suitable patterns of data tracks, such as annular patterns of concentric data tracks on the magnetic media 108 as shown in FIG. 1B.

At least one slider 113 is positioned near the magnetic media 108, each slider 113 supporting one or more magnetic head assemblies 121. As the magnetic media rotates, the slider 113 moves radially in and out over the media surface 160 so that the magnetic head assembly 121 may access different tracks of the magnetic media 108 where data are written. Each slider 113 is attached to an actuator arm 119 by way of a suspension 115. The suspension 115 provides a slight spring force which biases the slider 113 toward the media surface 160. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the magnetic recording device 100, the rotation of the magnetic media 108 generates an air bearing between the slider 113 and the media surface 160, which exerts an upward force or lift on the slider 113. The air bearing thus counter-balances the slight spring force of suspension 115 and supports the slider 113 off and slightly above the media 108 surface by a small, substantially constant spacing during normal operation. In an energy-assisted magnetic recording (EAMR) head, DC or AC electric-current flows through an assist element of the magnetic head assembly 121 and enhances the write-ability so that the write element of the magnetic head assembly 121 magnetizes the data bits in the media 108.

The various components of the magnetic recording device 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 108. The control unit 129 further comprises a preamplifier 150. Write and read signals are communicated to and from the control circuitry and the write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

FIG. 1B illustrates a top view of the media surface 160 of disk 108 of FIG. 1A. The media surface 160 may be a top surface of the disk 108 or a bottom surface of the disk 108. The media surface comprises a plurality of concentric groups of data tracks 130a-130d, wherein an outer data track group 130a of the plurality of groups of data tracks 130a-130d is located at the edge of the media surface 160, and an inner data track group 130d of the plurality of data tracks 130a-130d is located closest to the center of the media surface 112. As discussed below, there are various methods for writing data to the plurality of data tracks 130a-130d.

Figure 2:
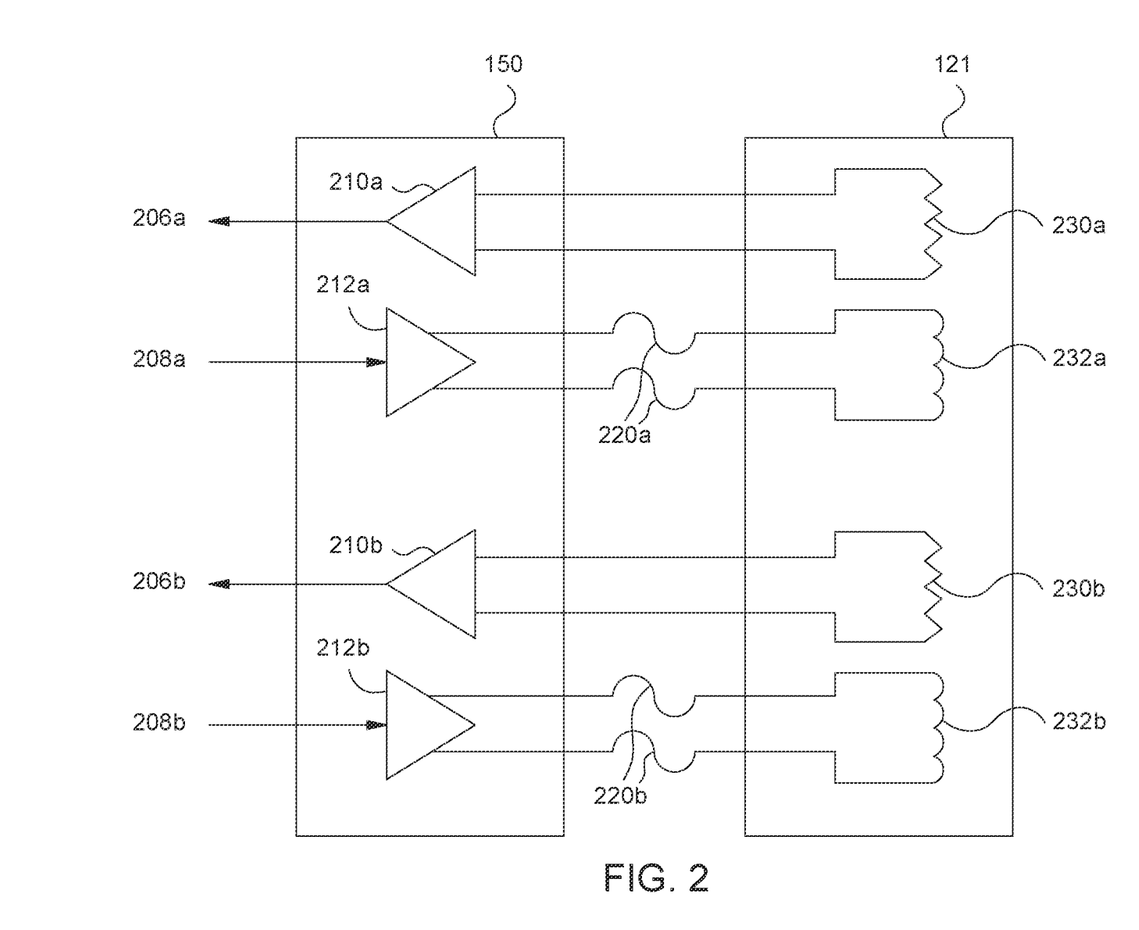
FIG. 2 illustrates a schematic diagram of a control unit circuitry of FIG. 1A.

FIG. 2 illustrates a schematic diagram of the control unit circuitry 129 of FIG. 1A. The preamplifier 150 comprises a first read amplifier 210a coupled to a first read transducer 230a of a first head, and a first write amplifier 212a coupled to a first write transducer 232a of the first head via the data recording channel 125. The first read transducer 230a and the first write transducer 232a are disposed within the magnetic head assembly 121 of FIG. 1A. A fuse(s) 220a is disposed between the first write amplifier 212a and the first write transducer 232a.

The preamplifier 150 further comprises a second read amplifier 210b coupled to a second read transducer 230b of a second head, and a second write amplifier 212b coupled to a second write transducer 232b of the second head via the data recording channel 125. The second read transducer 230b and the second write transducer 232b are disposed within the magnetic head assembly 121 of FIG. 1A. A fuse(s) 220b is disposed between the second write amplifier 212b and the second write transducer 232b.

During a write operation to a first media surface of a plurality of media surfaces of a multi-disk drive, a first write signal 208a is applied to the first write amplifier 212a. The first write amplifier 212a amplifies the output of the first write signal 208a, which is applied to the first write transducer 232a, permitting the first write transducer 232a to write data to the first media surface. Similarly, during a write operations to a second media surface of the plurality of media surfaces of the multi-disk drive, a second write signal 208*b* is applied to the second write amplifier 212*b*. The second write amplifier 212*b* amplifies the output of the second write signal 208*b*, which is applied to the second write transducer 230*b*, permitting the second write transducer 232*b* to write data to a second media surface.

During a read operation to a first media surface of the plurality of media surfaces of the multi-disk drive, a first read signal output 206*a* from the first read transducer 230*a* is amplified by the first read amplifier 210*a*, permitting the first read transducer 230*a* to read data from the first media surface. During a read operation to the second media surface of the plurality of media surfaces of the multi-disk drive, a second read signal output 206*b* from the second read transducer 230*b* is amplified by the second read amplifier 210*b*, permitting the second read transducer 230*b* to read data from the second media surface. Data may be written to/read from a other media surfaces using other write transducer and other read transducers using the same process described above.

Write access of the first write transducer 232*a* and/or the second write transducer 232*b* may be disabled by destroying the fuse(s) 220*a* and/or 220*b*, thereby interrupting the pathway between the write amplifier and the write transducer. The fuses 220*a* and 220*b* may be destroyed by overloading a capacity of the fuse, causing the fuse to blow. Once the fuse(s) have been blown, the write transducer(s) coupled to the pathway having the blown fuse will no longer function. However, there is no damage to the read transducer. Therefore, read capability is not impacted. Write capability may be re-established by replacing the blown fuse(s).

It is to be understood that although two read and write amplifiers have been shown, in a multi-disk drive a read amplifier is coupled to each read transducer of each head, and a write amplifier is coupled to each write transducer of each head. As such, the preamplifier 150 may contain any number of read and write amplifiers and read and write transducers according to the embodiment.

Figure 3:
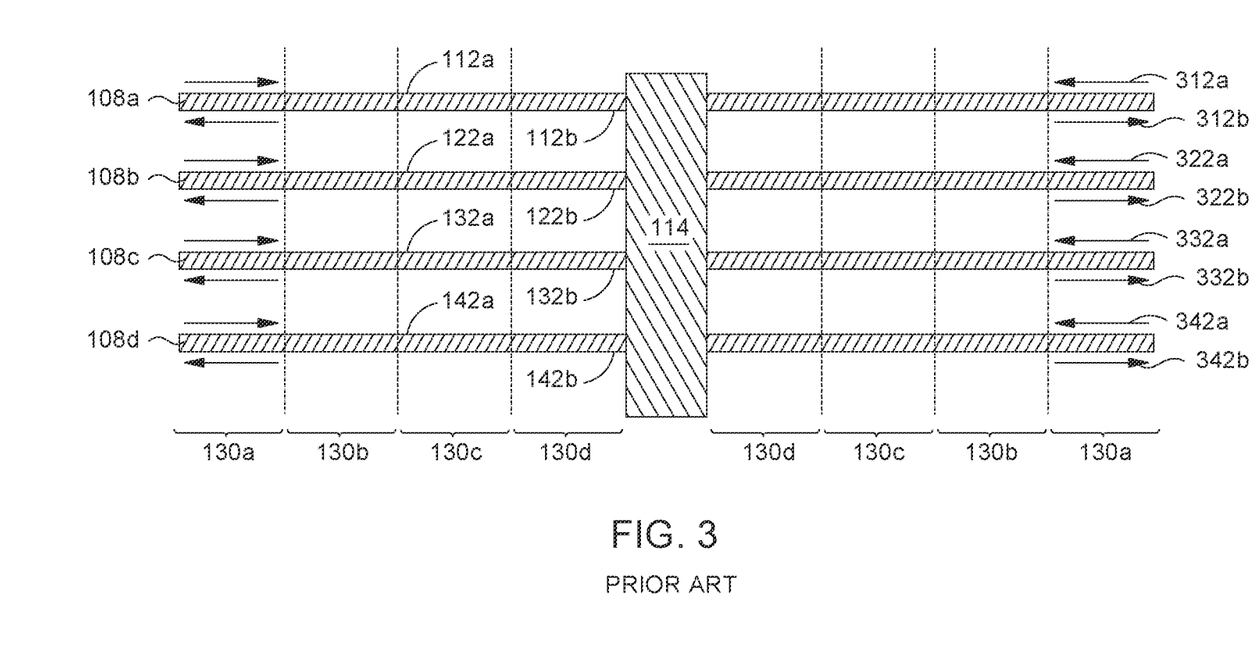
FIG. 3 illustrates a prior art method of writing data to a multi-disk drive.

FIG. 3 illustrates a prior art method of writing data to a multi-disk drive. The disk drive comprises a plurality of disks 108*a*-108*d*. Each disk of the plurality of disks 108*a*-108*d* comprises two media surfaces. For example, disk 108*a* comprises a first media surface 112*a*, and a second media surface 112*b*, wherein the first media surface 112*a* and the second media surface 112*b* are disposed on opposite sides of disk 108*a*. Similarly, disks 108*b*-108*c* have media surfaces 122*a*, 122*b*, 132*a*, 132*b*, 142*a*, 142*b*. Each media surface of the plurality of disks 108*a*-108*d* comprises a plurality of radially spaced, concentric groups of data tracks 130*a*-130*d*, such as described in FIG. 1B. As shown, each group of track is constrained to a cylindrical portion of the column of disks, and there may be dozens or hundreds of tracks on a surface within a track group. Each track is further divided into individual data sectors. This division into various cylindrical portions is a part of an access scheme commonly known as Cylinder-Head-Sector (C-H-S), where the drive maps each access to a data sector by a unique combination of cylinder, head, and sector number.

During a write operation, as shown by write paths 312*a*-312*b*, 322*a*-322*b*, 332*a*-332*b*, and 342*a*-342*b*, data is initially written to an outer data track group 130*a* of each disk of the plurality of disks 108*a*-108*d* before data is written to an inner data track group of any of the disks (i.e. data track group 130*b* is not written to until the first data 130*a* on each media surface has been filled). This could be done, for example, by an address mapping scheme that constrains consecutive ranges of data addresses (e.g., logical block addresses) onto a track group. This is conventionally referred to as a "serpentine" writing scheme due to the zig-zag nature of the write path traversing through the cylinder-based track group, across the various surfaces as shown. One net effect of this serpentine writing scheme is that the available memory of each disk of the plurality of disks 108*a*-108*d* is filled at approximately the same rate. A benefit of writing data in this manner is that the seek time during a read operation is greatly reduced because it takes a shorter amount of time to search a single data track, such as data track group 130*a*, of each media surface than it does to search the entire media surface (i.e. data track groups 130*a*-130*d*) of a single media surface. However, the prior art method of writing data to the same data track group of each media surface of a plurality of media surfaces before progressing to writing data to another data track group of each media surface of a plurality of media surfaces creates a security issue.

It is to be understood, that although the first media surface 112*a* and the second disc surface 112*b* are shown as being a top surface and a bottom surface of disk 108*a*, the first media surface 112*a* and the second media surface 112*b* may be located on different disk. For example, the first media surface 112*a* may be a top or bottom surface of disk 108*a*, and the second disk 112*b* surface may be a top or bottom surface of disk 108*b*.

When a security breach of a data storage device occurs, written data may be vulnerable to being re-written, corrupted, or erased. As a preventative measure, or when a security breach has occurred, it may be beneficial to disable write access to one or more media surfaces of the plurality of media surfaces. For example, disabling write access may be achieved by disabling a write head, and in such a disablement scheme, once a write head is disabled, the associated entire media surface would be rendered un-writeable. However, while disabling write access to a media surface improves security, it also prevents a user from continuing to write data to any available memory left on the media surface. This may be problematic when data is written in the prior art manner as described above (i.e. where the available memory of each media surface is filled at approximately the same rate) because a user may be forced to choose between prioritizing security needs, or prioritizing memory needs.

For example, if data has been written to data track groups 130*a* and 130*b* of disks 108*a*-180*d*, and write access to disks 108*a* and 108*b* is disabled in response to a security breach or in response to a command from a user (i.e. prioritizing security), the available memory of data tracks 130*c* and 130*d* of disk 108*a* and 108*b* is unusable. Alternatively, if write access to a media surface is maintained until all of the available memory of the media surface has been filled (i.e. data tracks 130*a*-130*d* of the media surface has been filled, thus prioritizing utilization of memory), data is more vulnerable to security breaches because the available memory of each media surface is filled at approximately the same rate, meaning that write access to one media surface cannot be disabled significantly earlier than write access to another media surface. In the example in FIG. 3, to fully utilize the capacity of the drive, write disablement to an individual media surface can't be executed unless the other media surfaces are also substantially filled.

As such, the following embodiments focus on various methods for filling an available memory of a single media surface of a plurality of media surfaces of a disk drive before beginning to fill an available memory of subsequent media surfaces of the plurality of media surfaces, so that write access to the plurality of media surfaces can be progressively disabled, thereby improving security without decreasing the overall available memory of the disk drive.

Figure 4A:
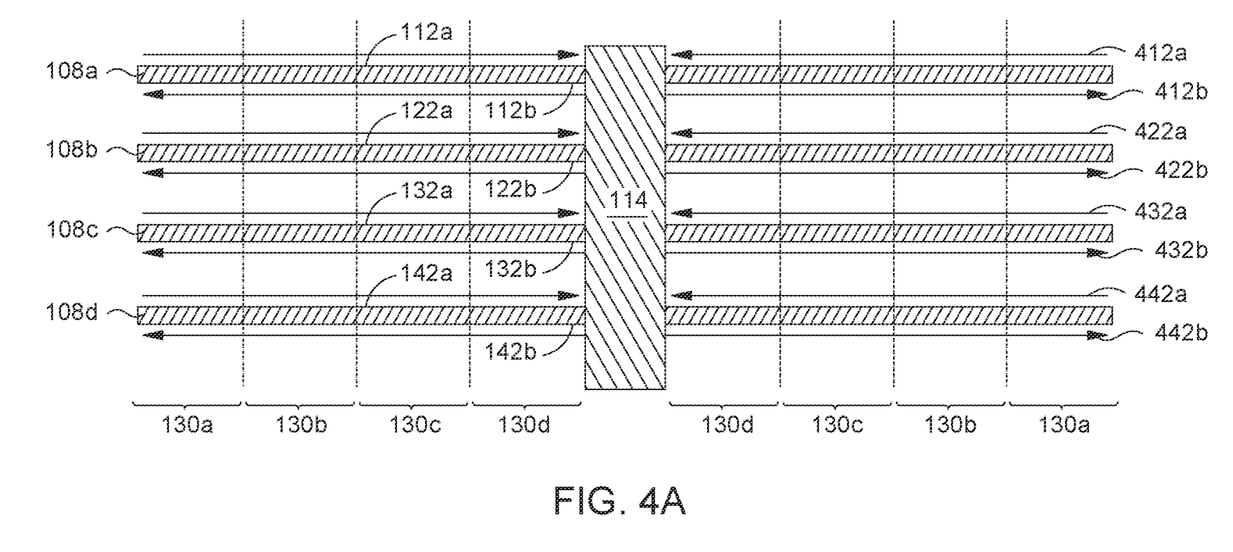
FIGS. 4A and 4B illustrate writing data to a multi-disk drive using a full disk serpentine write path according to various embodiments.
Figure 4B:
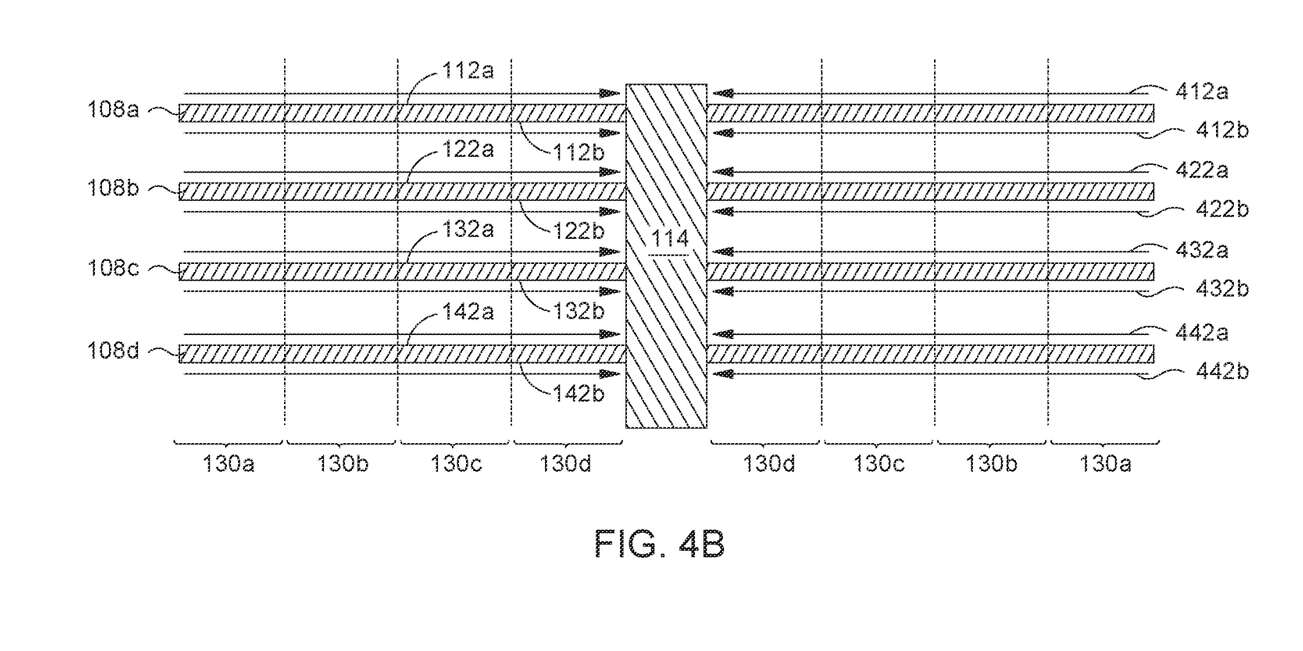

FIGS. 4A and 4B illustrate writing data to a multi-disk drive using a full disk serpentine write path according to various embodiments. FIG. 4A is similar to FIG. 3; however, here the write pattern differs.

During a write operation, as shown by write path 412a, a control circuitry, such the control circuitry 129 of FIG. 1A and FIG. 2, is configured to write data to data track groups 130a-130d of a first media surface 112a of disk 108a, wherein data is written from an outer data track to an inner data track (i.e. data is written from data track group 130a inwards to data track group 130d). The control circuitry, is further configured to receive an indication that the first media surface has been filled, and then begin writing data to a second media surface 112b of disk 108a in response to receiving the indication that an available memory of the first media surface has been filled, wherein data is written from an inner data track to an outer data track (i.e. data is written from data track group 130d outwards to data track group 130a) on write path 412b.

The same pattern of writing data is repeated on subsequent disk, wherein data is written to the next available media surface of the plurality of disks 108a-108d once the available memory of a preceding media surface has been filled. For example, after disk 108a is full, disk 108b is written by first writing on a first media surface 122a on write path 422a and then writing on a second media surface 122b on write path 422b after first media surface 122a is full. Similarly, once the second media surface 122b is full, disk 108c is written by first writing on a first media surface 132a on write path 432a and then writing on a second media surface 132b on write path 432b after first media surface 132a is full. Similarly, once the second media surface 132b is full, disk 108d is written by first writing on a first media surface 142a on write path 442a and then writing on a second media surface 142b on write path 442b after first media surface 142a is full. In each case, in FIG. 4A, the writing occurs from the outermost data track group 130a to the innermost data track group 130d for one surface of a disk 108a-108d and then from the innermost data track group 130d to the outermost data track group 130a on a surface opposite thereto of the same disk 108a-108d.

A benefit of writing a first media surface of a disk from an outer data track group 130a to an inner data track group 130d, and writing a second media surface of the disk from an inner data track group 130d to an outer data track group 130a is that the magnetic head assembly 121 (see FIG. 1A) does not have to be repositioned at a different location over the plurality of disk 108a-108d in order to begin the next write operation on the second media surface, thereby improving write time.

FIG. 4B is similar to FIG. 4A; however here, each media surface of plurality of disks 108a-108d are written from and outer data track group 130a to an inner data track group 130d. For example, during a write operation, a first media surface 112a of disk 108a is written to from the first data track group 130a inwards to the inner data track group 130d. Once the first media surface 112a is filled, then the second media surface 112b of disk 108a is written to from the first data track group 130a inwards to the inner data track group 130d.

In various embodiments, the full-disk serpentine writing pattern of FIGS. 4A-4B may include an addressing scheme that puts consecutive ranges of data addresses (e.g., logical block addresses (LBAs)) over an entire media surface rather than a specific cylindrical track group that spans multiple media surfaces as shown in FIG. 3. As an example, LBA 0–M may be mapped onto the tracks on the top surface 112a of disk 108a, and LBAs M+1 to N may be mapped onto the tracks on the bottom surface 112b of disk 108a. LBAs N+1 to O may be mapped onto the tracks on the top surface 122a of disk 108b, and so on, following the full-disk serpentine writing pattern. In other embodiments, the ranges within each media surface are consecutive, but the ranges do not need to be consecutive as between top and bottom surfaces (e.g., the first range can be on the top surface 112a of disk 108a and the second (next) range can be on the top surface 142a of disk 108d (rather than the bottom surface 112b of disk 108a).

In some embodiments, the drive may be configured to implement an indirection scheme so that writes from the host are written in the full-disk serpentine pattern as shown regardless of LBAs involved, and an indirection mapping table is maintained to correspond the LBAs to the physical locations where such LBAs are written. As an example, during a first period of time, LBAs are written to the first media surface, and once the first media surface filled, in a second period of time after that first period, LBAs are then written to a second media surface, as shown in FIGS. 4A-4B.

A benefit of beginning a write operation at the outer data track (i.e. 130a) of each media surface is that the tracks near the outer track of a given media surface has a higher data rate so that data can be written faster than near the inner diameter of the disk.

However, regardless of the direction of the write path, a benefit of filling all available memory of a first media surface before writing data to a second media surface is that write access to the plurality of media surfaces of the disks 108a-108d can be progressively disabled. In this manner, the full disk serpentine provides an alignment between (1) the granularity of the write disablement method (per head-media surface) and (2) the fill pattern of the disks (disk surface based rather than cylindrical based). Additionally, regardless of the direction of the write path, there are various methods for disabling write access to one or more media surfaces of the plurality of disks 108a-108d. For example, in one embodiment, a control circuitry is configured to disable write access to a first media surface in response to the first media surface being filled (e.g. the control circuitry receiving an indication that an available memory of the first media surface has been filled) (i.e. write access to a media surface is automatically disabled once all available memory of the media surface has been filled).

In another embodiment, a control circuitry is configured to disable write access to one or more media surfaces of disks 108a-108d in response to the control circuitry receiving command from a host that a threshold has been reached. The threshold may corresponds to one or more of a maximum elapsed time or a minimum percentage of a total available memory of the data storage device remaining.

In another embodiment, a control circuitry is configured to disable write access to one or more media surfaces of disks 108a-108d in response to the control circuitry receiving an indication from a host that a security breach has occurred.

In another embodiment, control circuitry is configured to send a prompt to a user to issue a command to disable write access to one or more media surfaces of the disks 108a-108d in response to the control circuitry receiving an indication of any of the above (i.e. instead of the control circuitry being configured to automatically disable write access in response to one of the above actions, the control circuitry is configured to prompt a user to issue a command to disable write access). The control circuitry is further configured to disable write access to one or more media surfaces of disks 108a-108d in response to receiving a command from a user to disable write access to one or more media surfaces of disks 108a-108d.

It is to be understood, that write access to a single media surface may be disabled while still permitting write access to other media surfaces, or write access to multiple media surfaces may be disabled at once. It is to be further understood that read access to each media surface of the disks 108a-108d is maintained independently of the write access to each media surface of the disks 108a-108d. As such, a user can still read data from any media surface, including media surfaces where write access has been disabled.

In another embodiment, at least a portion of the available memory of at least one media surface of the disks 108a-108d is reserved. The reserved memory may be used to relocate data from written to another location in the disk drive. For example, a second media surface 142b of disk 108d may be reserved so that data written to a first media surface 112a of disk 108a can be relocated after write access to the first media surface 112a has been disabled. The reserved memory may also be reserved for housekeeping data.

It is to be further understood that of the above methods may be used individually, or in conjunction. For example, a control circuitry may be configured to automatically disable write access to one or more media surfaces of disks 108a-108d when half of the available memory of the disk drive has been filled (i.e. media surfaces 112a, 112b, 122a, and 122b), and the control circuitry may further be configured to send a prompt to a user to disable write access to one or more media surfaces of disks 108a-108d in response to receiving an indication from a host that a security breach has occurred. Thus, if the security breach occurs before the control circuitry has automatically disabled write access to one or more media surfaces of the disks 108a-108d, the user may choose to disable write access to one or more media surfaces of the disk 108a-108d prior to the control circuitry automatically disabling write access. Alternatively, if the security breach occurs after the control circuitry has automatically disabled write access to one or more media surfaces of the disks 108a-108d, but additional media surfaces have been written to, such as media surface 132a and 132b, the user may choose to disable write access to additional media surfaces, such as media surface 132a and/or 132b.

It is to be understood that write access may be disabled by a clear hardware interruption that cannot be undone by any software hacking (e.g., destroying a fuse coupled to a write transducer of a write head configured to write data to a media surface, as described in FIG. 2).

Figure 5:
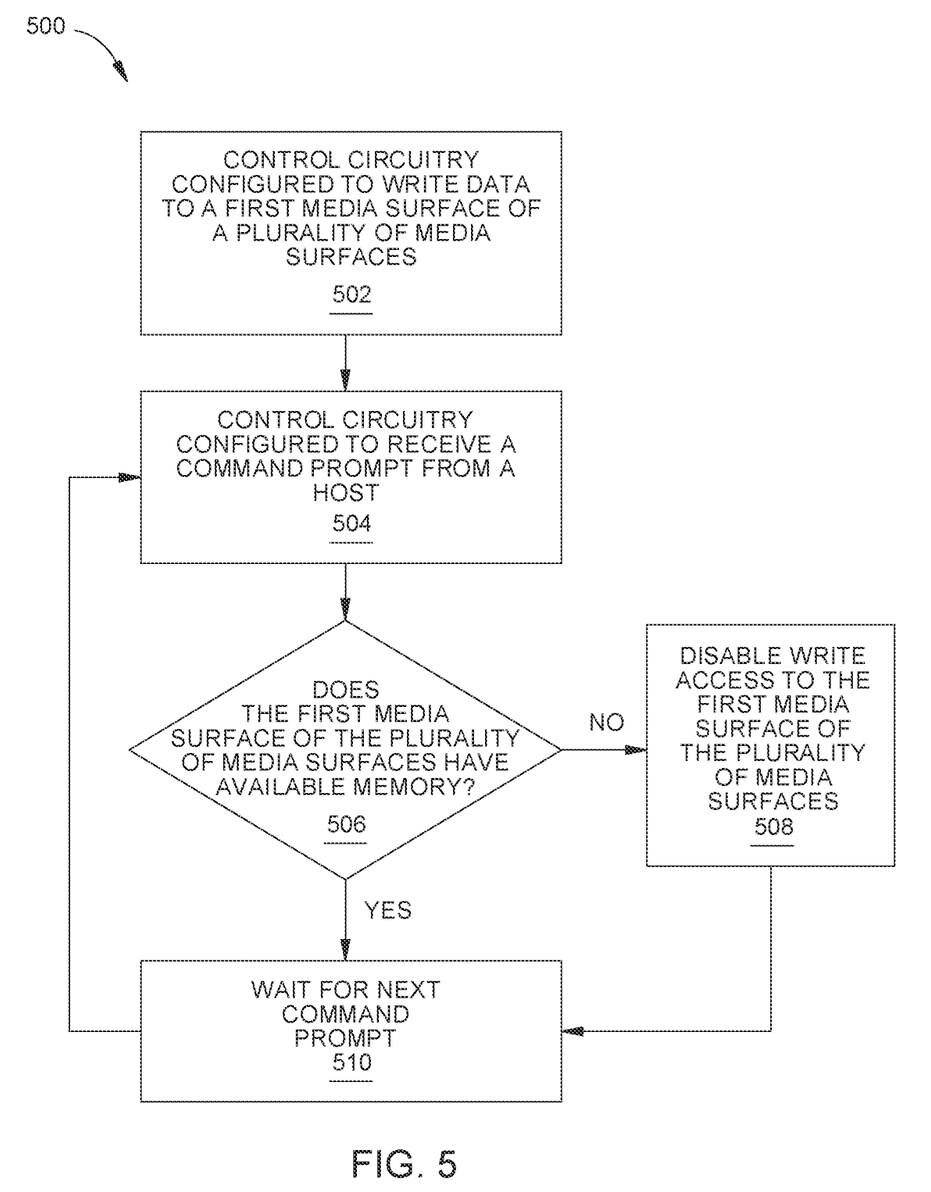
FIGS. 5 and 6 are flow diagrams illustrating various methods of disabling write access to a media surface according to various embodiments.
Figure 6:
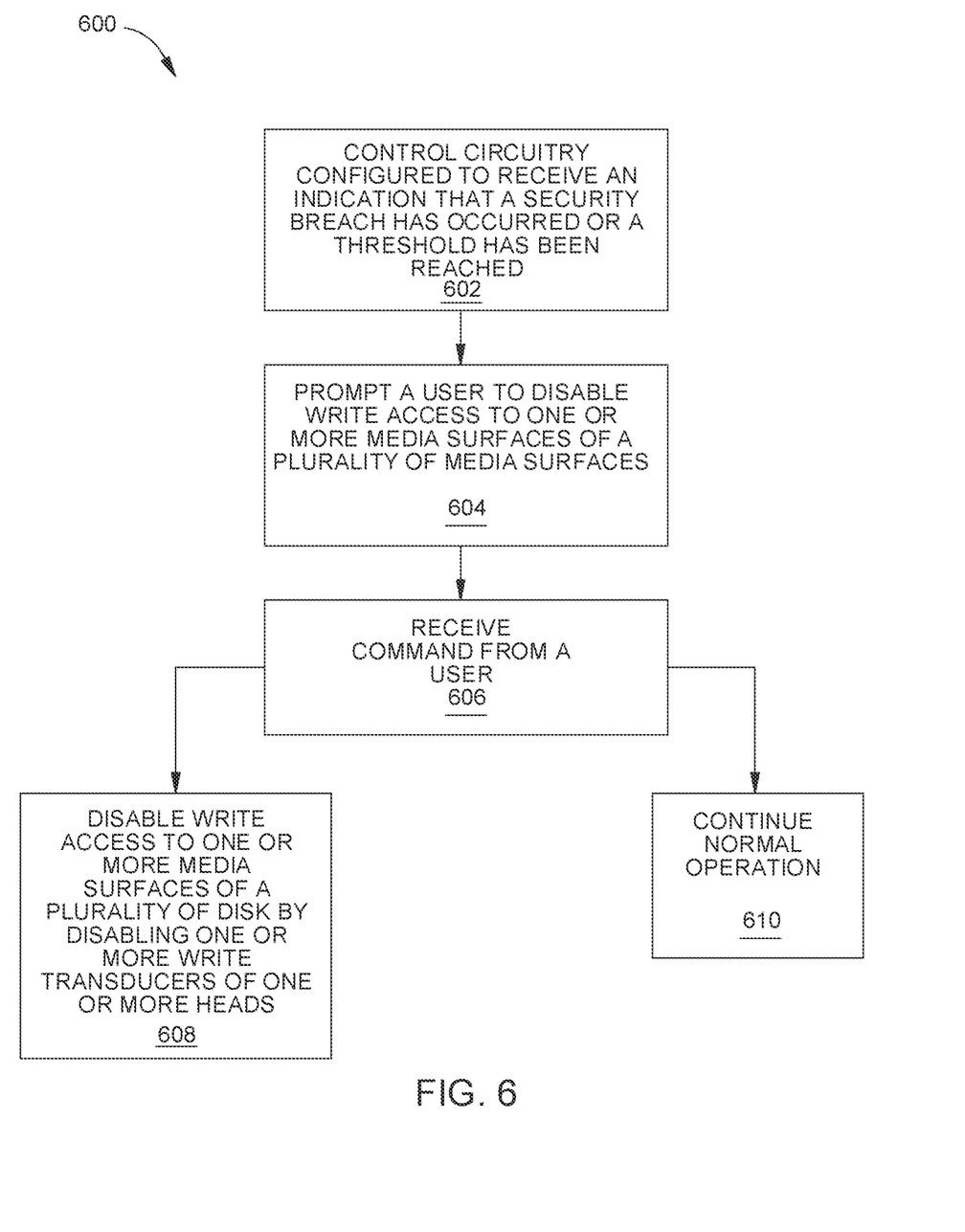

FIGS. 5 and 6 are flow diagrams illustrating various methods of disabling write access to a media surface according to various embodiments. Method 500 is a flow diagram illustrating a method of automatically disabling write access to a media surface that has been written using a full serpentine write path. At 502, a control circuitry, such as the control circuitry 129 of FIGS. 1A and 1B, is configured to write data to a first media surface of a plurality of media surfaces, such as a top surface of disk 108a of FIGS. 4A and 4B. At 504, the control circuitry is configured to receive a command prompt from a host, wherein the command prompt is a command to write data to the first media surface. At 506, the control circuitry is configured to determine if the media surface has an available memory. If the first media surface does not have any available memory, then at 508 the control circuitry is configured to disable write access to the first media surface, and wait for the next command prompt. If the media surface does have available memory, then at 510 the control circuitry is configured to wait for the next command prompt.

Method 600 is a flow diagram illustrating a method of disabling write access to one or more media surfaces of a plurality of media surfaces that have been written using a full serpentine write path At 602, a control circuitry, such as the control circuitry 129 of FIGS. 1A and 1B, is configured to receive an indication that a security breach has occurred, or that a threshold has been reached, wherein the threshold may be a maximum elapsed time since writing data to the disk drive has begun or a minimum available memory of the disk drive remains. At 604, in response to receiving the indication, the control circuitry is configured to prompt a user to disable write access to one or more media surfaces of a plurality of media surfaces. At 606, the control circuitry is configured to receive a command from the user. At 608, the control circuitry is configured to disable write access to one or more media surfaces a plurality of media surfaces by disabling one or more write transducers of one or more heads. However, if the user decides to continue to permit write access to the one or more media surfaces of the plurality of media surfaces, then at 610, the control circuitry is configured to continue normal operation (i.e., the control circuitry does not disable the write transducer of the head).

It is to be understood that the user may issue a command to disable write access to one or more media surfaces and simultaneously issue a command to continue normal operation and permit write access or one or more media surfaces. For example, if disk 108a-108c of FIGS. 4A and 4B have been written to, and a user receives a prompt from the control circuitry to disable write access, the user may disable write access to disk 108a, but continue to permit write access to disks 108b-108d. Alternatively, the user may disable write access to all disks that have been written to, here disk 108a-108c, but continue to permit write access to disk 108d which has not been written to.

By filling the available memory of a media surface of a plurality of media surfaces before writing data to subsequent media surfaces of the plurality of media surfaces, write access to the plurality of media surfaces that have been written to can be progressively disabled, thereby increasing security without decreasing available memory of a disk drive.

In one embodiment, a data storage device comprises: a first media surface; a first head configured to be actuated over the first media surface, wherein the first head comprises a first write transducer and a first read transducer; a second media surface; a second head configured to be actuated over the second media surface, wherein the second head comprises a second write transducer and a second read transducer; and control circuitry configured to: first write data to the first media surface using the first write transducer of the first head; optionally receive an indication that an available memory of the first media surface has been filled; and then upon filling the first media surface begin to write data to the second media surface using the second write transducer.

The control circuitry is further configured to map a first consecutive range of addresses to the first media surface and a second consecutive range of addresses to the second media surface. The control circuitry is further configured to maintain an address indirection table to map: (a) logical block addresses written to the first media surface during a first time period; and (b) logical block addresses written to the second media surface during a second time period that is after the first time period.

The first media surface is located on a first side of a disk, and the second media surface of located on a second side of the disk. The first media surface is sequentially written from an outer most track to an inner most track; and wherein the second media surface is sequentially written from an outer most track to an inner most track. The first media surface is sequentially written from an outer most track to an inner most track; and wherein the second media surface is sequentially written from an inner most track to an outer most track. The control circuitry comprises a preamplifier; the first head and the second head are coupled to the preamplifier; and the preamplifier is configured to disable write access of at least one of the first head and the second head. The preamplifier is configured to disable write access of at least one of the first write transducer and the second write transducer by destroying a first fuse coupled to the first write transducer, and/or destroying a second fuse coupled to the second write transducer. The data storage device, wherein the control circuitry is configured to permit read access after destroying the first fuse and/or the second fuse. The preamplifier is configured to disable the first write transducer in response to the control circuitry receiving an indication that an available memory of the first disk has been filled.

The preamplifier is configured to disable at least one of the first write transducer and the second write transducer in response to the control circuitry receiving a command from a host that a security breach has occurred. The preamplifier is configured to disable at least one of the first write transducer and the second write transducer in response to the control circuitry receiving an indication from a host that a threshold has been reached.

The threshold corresponds to either: a maximum elapsed time; or a minimum percentage of a total available memory of the data storage device. The control circuitry is configured to re-establish write access.

In another embodiment, a data storage device comprises: a first media surface; a first head configured to be actuated over the first media surface wherein the first head comprises a first write transducer and a first read transducer; a second media surface; a second head configured to be actuated over the second media surface wherein the second head comprises a second write transducer and a second read transducer; a third media surface; a third head configured to be actuated over the third media surface wherein the third head comprises a third write transducer and a third read transducer; and control circuitry configured to: first write data to the first media surface using the first write transducer; then upon filling the first media surface write data to the second media surface using the second write transducer; and reserve a portion of an available memory of the third media surface.

The control circuitry is further configured to relocate data written to the first media surface to the third media surface. The control circuitry is further configured to send a request to a user to prompt the user to disable at least one of the first write transducer, the second write transducer, and a third write transducer of the third head. The control circuitry is further configured to continue to permit the first write transducer, the second write transducer, and the third write transducer to remain operable in response to receiving a command from the user. The control circuitry is further configured to disable at least one of the first write transducer, the second write transducer, and the third write transducer in response to receiving a command from the user. The command from the user is a command to: disable the first write transducer while continuing to permit read access to the first media surface; and continue to permit read and write access to the second media surface and the third media surface. The command from the user is a command to: disable the first write transducer while continuing to permit read access to the first media surface; disable the second write transducer while continuing to permit read access to the second media surface; and continue to permit read and write access to the third media surface. The command from the user is a command to disable each of the first write transducer, the second write transducer, and the third write transducer.

In yet another embodiment, a data storage device comprises: a plurality of media surfaces; a plurality of heads disposed over the plurality of media surfaces, wherein each head of the plurality of heads is capable of being actuated over a different media surface of the plurality of media surfaces, and wherein each head of the plurality of heads comprises a write transducer and a read transducer; and control circuitry configured to: first write data to a first media surface of the plurality of media surfaces using a first write transducer of a first head of the plurality of heads; and then upon filling the first media surface write data to a second media surface of the plurality of media surfaces using a second write transducer of a second head of the plurality of heads; means to disable at least one write transducer of the plurality of heads.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a first media surface;
   a first head configured to be actuated over the first media surface, wherein the first head comprises a first write transducer and a first read transducer, wherein the first media surface is sequentially written from an outer-most track to an inner-most track;
   a second media surface;
   a second head configured to be actuated over the second media surface, wherein the second head comprises a second write transducer and a second read transducer, wherein the second media surface is sequentially written from an inner-most track to an outer-most track; and
   control circuitry configured to:
      disable write access of at least one of the first head and the second head, wherein disabling the write access comprises interrupting a pathway coupled to at least one of the first and second write transducers;
      first write data to the first media surface using the first write transducer of the first head; and
      then upon filling the first media surface:
         begin to write data to the second media surface using the second write transducer.

2. The data storage device of claim 1, wherein the control circuitry is further configured to map a first consecutive range of addresses to the first media surface and a second consecutive range of addresses to the second media surface.

3. The data storage device of claim 1, wherein the control circuitry is further configured to maintain an address indirection table to map:
   (a) logical block addresses written to the first media surface during a first time period; and
   (b) logical block addresses written to the second media surface during a second time period that is after the first time period.

4. The data storage device of claim 1, wherein the first media surface is located on a first side of a disk, and the second media surface of located on a second side of the disk.

5. The data storage device of claim 1,
wherein the first media surface is sequentially written from an outer-most track to an inner-most track; and
wherein the second media surface is sequentially written from an outer-most track to an inner-most track.

6. The data storage device of claim 1, wherein:
the control circuitry comprises a preamplifier;
the first head and the second head are coupled to the preamplifier; and
the preamplifier is configured to disable write access of at least one of the first head and the second head.

7. The data storage device of claim 6, wherein the preamplifier is configured to disable write access of at least one of the first write transducer and the second write transducer by destroying a first fuse coupled to the first write transducer, and/or destroying a second fuse coupled to the second write transducer.

8. The data storage device of claim 7, wherein the control circuitry is configured to permit read access after destroying the first fuse and/or the second fuse.

9. The data storage device of claim 6, wherein the preamplifier is configured to disable the first write transducer in response to the filling of the first media surface.

10. The data storage device of claim 6, wherein the preamplifier is configured to disable at least one of the first write transducer and the second write transducer in response to the control circuitry receiving an indication from a host that a security breach has occurred.

11. The data storage device of claim 6, wherein the preamplifier is configured to disable at least one of the first write transducer and the second write transducer in response to the control circuitry receiving a command from a host that a threshold has been reached.

12. The data storage device of claim 11, wherein the threshold corresponds to either:
a maximum elapsed time; or
a minimum percentage of a total available memory of the data storage device.

13. A data storage device, comprising:
a first media surface;
a first head configured to be actuated over the first media surface wherein the first head comprises a first write transducer and a first read transducer, wherein the first media surface is sequentially written from an outer-most track to an inner-most track;
a second media surface;
a second head configured to be actuated over the second media surface wherein the second head comprises a second write transducer and a second read transducer, wherein the second media surface is sequentially written from an inner-most track to an outer-most track;
a third media surface;
a third head configured to be actuated over the third media surface wherein the third head comprises a third write transducer and a third read transducer; and
control circuitry configured to:
first write data to the first media surface using the first write transducer;
then upon filling the first media surface write data to the second media surface using the second write transducer; disable write access of at least one of the first head and the second head, wherein disabling the write access comprises interrupting a pathway coupled to at least one of the first and second write transducers; and
reserve a portion of an available memory of the third media surface.

14. The data storage device of claim 13, wherein the control circuitry is further configured to relocate data written to the first media surface to the third media surface.

15. The data storage device of claim 13, wherein the control circuitry is further configured to send a request to a user to prompt the user to disable at least one of the first write transducer, the second write transducer, and a third write transducer of the third head.

16. The data storage device of claim 15, wherein the control circuitry is further configured to continue to permit the first write transducer, the second write transducer, and the third write transducer to remain operable in response to receiving a command from the user.

17. The data storage device of claim 15, wherein the control circuitry is further configured to disable at least one of the first write transducer, the second write transducer, and the third write transducer in response to receiving a command from the user.

18. The data storage device of claim 17, wherein the command from the user is a command to:
disable the first write transducer while continuing to permit read access to the first media surface; and
continue to permit read and write access to the second media surface and the third media surface.

19. The data storage device of claim 17, wherein the command from the user is a command to:
disable the first write transducer while continuing to permit read access to the first media surface;
disable the second write transducer while continuing to permit read access to the second media surface; and
continue to permit read and write access to the third media surface.

20. The data storage device of claim 17, wherein the command from the user is a command to disable each of the first write transducer, the second write transducer, and the third write transducer.

21. A data storage device, comprising:
a plurality of media surfaces;
a plurality of heads disposed over the plurality of media surfaces, wherein each head of the plurality of heads is capable of being actuated over a different media surface of the plurality of media surfaces, and wherein each head of the plurality of heads comprises a write transducer and a read transducer;
control circuitry configured to:
first write data to a first media surface of the plurality of media surfaces using a first write transducer of a first head of the plurality of heads, wherein the first media surface is sequentially written from an outer-most track to an inner-most track; and
then upon filling the first media surface write data to a second media surface of the plurality of media surfaces using a second write transducer of a second head of the plurality of heads, wherein the second media surface is sequentially written from an inner-most track to an outer-most track; and
means to disable at least one write transducer of the plurality of heads, wherein the means to disable the at least one write transducer comprises a means to render inoperable a fuse coupled to the at least one write transducer.

* * * * *